US00RE35667E

United States Patent [19]

Heiligman

[11] E Patent Number: Re. 35,667

[45] Reissued Date of Patent: Nov. 25, 1997

[54] FAUCET-MOUNTED WATER FILTER WITH WALL INLET AND ANNULAR CHAMBER

[75] Inventor: Randy B. Heiligman, Minnetoka, Minn.

[73] Assignee: Ultrapure Systems, Inc., Northbrook, Ill.

[21] Appl. No.: 170,492

[22] Filed: Dec. 20, 1993

Related U.S. Patent Documents

Reissue of:

[64] Patent No.: 5,017,286
Issued: May 21, 1991
Appl. No.: 579,787
Filed: Sep. 10, 1990

U.S. Applications:

[63] Continuation of Ser. No. 488,700, Mar. 5, 1990, abandoned.

[51] Int. Cl.[6] ..... B01D 24/10

[52] U.S. Cl. ..... 210/266; 210/282; 210/288; 210/423; 210/424; 210/316; 210/449

[58] Field of Search ..... 210/266, 282, 210/288, 423, 422, 424, 316, 428, 429, 432, 449, 448

[56] References Cited

U.S. PATENT DOCUMENTS

| | | | |
|---|---|---|---|
| 606,804 | 7/1898 | Eastman | 210/448 |
| 3,802,563 | 4/1974 | Sasaki et al. | 210/120 |
| 3,853,761 | 12/1974 | McClory | 210/100 |
| 4,147,631 | 4/1979 | Deines et al. | 210/152 |
| 4,172,796 | 10/1979 | Corder | 210/238 |
| 4,212,743 | 7/1980 | Van Meter et al. | 210/282 |
| 4,218,317 | 8/1980 | Kirschmann | 210/449 |
| 4,504,389 | 3/1985 | Rundzaitis | 210/266 |
| 4,536,290 | 8/1985 | Bonazzo | 210/449 |
| 4,591,438 | 5/1986 | Tanabe et al. | 210/282 |
| 4,680,116 | 7/1987 | Kamiwada et al. | 210/282 |
| 4,686,037 | 8/1987 | Lang | 210/449 |
| 4,711,723 | 12/1987 | Bray | 210/652 |
| 4,713,175 | 12/1987 | Bray | 210/259 |
| 4,732,674 | 3/1988 | Tamura et al. | 210/266 |
| 4,753,728 | 6/1988 | VanderBilt et al. | 210/282 |
| 4,770,768 | 9/1988 | Lang | 210/232 |
| 4,814,078 | 3/1989 | Stern et al. | 210/282 |
| 4,877,521 | 10/1989 | Petrucci et al. | 210/171 |
| 5,114,570 | 5/1992 | Nelson et al. | 210/282 |
| 5,151,179 | 9/1992 | Bach et al. | 210/282 |
| 5,192,436 | 3/1993 | Sasaki et al. | 210/282 |
| 5,525,214 | 6/1996 | Hembree | 210/282 |
| 5,527,451 | 6/1996 | Hembree et al. | 210/88 |

*Primary Examiner*—Cynthia L. Nessler
*Attorney, Agent, or Firm*—Kinney & Lange, P.A.

[57] ABSTRACT

The invention provides a faucet-mounted water filter comprising an upright tubular diverter body that is adapted to be secured to the open end of the water faucet. At the bottom of the diverter body is a water outlet through which unfiltered water can be dispensed. In the diverter body is a valve with a valve outlet duct projecting from one side of the diverter body. A manually movable valve handle projects from the diverter body and is connected to the valve for directing the flow of water either through the water outlet (when unfiltered water is required) or for diverting water through the outlet duct. A filter housing is mounted upon the duct and is preferably connected to the diverter by means of the duct. A carbon block filter element is provided in the filter housing which includes a vertical water inlet surface on an outside wall and a water outlet at the bottom. The filter housing includes an annular water distribution chamber for unfiltered water which surrounds the filter element. The outlet duct of the valve is connected through the side of the filter housing at an elevation which communicates through the annular water distribution chamber with the water inlet surface of the filter element. The water outlet at the bottom of the filter element communicates with a dispensing opening for filtered water at the bottom of the filter housing. If desired, a paper prefilter is provided for filtering the water before it enters the carbon block filter.

41 Claims, 3 Drawing Sheets

FAUCET-MOUNTED WATER FILTER WITH WALL INLET AND ANNULAR CHAMBER

Matter enclosed in heavy brackets [ ] appears in the original patent but forms no part of this reissue specification; matter printed in italics indicates the additions made by reissue.

A continuation of application Ser. No. 488,700 filed Mar. 5, 1990, bearing the same title, now abandoned.

FIELD OF THE INVENTION

The present invention relates to water filtration and more particularly to a filter suited for mounting on a water faucet.

BACKGROUND OF THE INVENTION

A variety of faucet-mounted water filters such as those described in patents U.S. Pat. Nos. 4,172,796; 4,680,116; 4,686,037 and 4,770,768 have been previously described. Filters of this type have a number of shortcomings. They are complicated in construction, require numerous parts, and are consequently expensive to produce. The unfiltered water is forced to make a circuitous route through the filter housing which requires internal ductwork, usually to direct the water to the top or bottom of the filter. This complicates the construction and requires intricate molds. For example, patents U.S. Pat. Nos. 4,686,037 and 4,770,768 both require 27 separate parts. Moreover, in these patents, the filter is spaced a substantial distance to one side of the faucet by means of a horizontally disposed base portion which is enclosed within an upper and lower cover primarily for aesthetic purposes. As a result, the device is not only complicated but, because the filter is mounted a substantial distance to one side of the faucet, it occupies more space around the end of the faucet and tends to be in the way of the user. Moreover, the filter cartridges contain a granular filter material through which channels can form so that a substantial fraction of the water passes through unfiltered. Complicated ductwork is also required to direct water through an inlet surface at the bottom of the cartridge and to collect it from an outlet surface at the top of the cartridge. Another problem results from the use of a rotary diverter valve which stays in the "on" or "filter" position once set there. The valve body also extends horizontally at right angles to the downward direction of the water flowing out of the faucet. This tends to displace the filter housing further from the center axis of the water faucet. Another shortcoming is the inability to remove heavy metals and the lack of a way to pass water first through a carbon filter and then through a second filter medium.

In view of these and other deficiencies of the prior art, it is a general objective to provide an improved faucet-mounted water filter which is highly efficient in its water filtration capabilities, is compact and rugged in construction and has been reduced in cost through the elimination of a number of parts previously employed. It is a further object to reduce the amount of space occupied around the end of the faucet by having the filter and associated structure positioned close to the end of the water faucet. A further object is to both filter the water and remove chemical impurities through absorption, to lessen the possibility of channeling within the filter so that the filter lasts longer before requiring replacement. It is also an object to provide a faucet-mounted water filter that is easy to install and maintain. It is another object to provide a filter having an upright tubular water diverter with a filter housing connected to the diverter by means of a duct which projects from the wall of the diverter to the filter housing. A further object is to provide a way of having the diverter valve indicate its setting, "filter" or "nonfilter", and to return automatically to the nonfilter position when the water is turned off. Yet another object is to provide a prefilter formed from paper or the like and a carbon block filter to receive water that has passed through the prefilter.

These and other more detailed and specific objects of the invention will be better understood by reference to the following detailed description and figures which illustrate by way of example but a few of the various forms of the invention within the scope of the appended claims.

THE FIGURES

SUMMARY OF THE INVENTION

Figure 1:
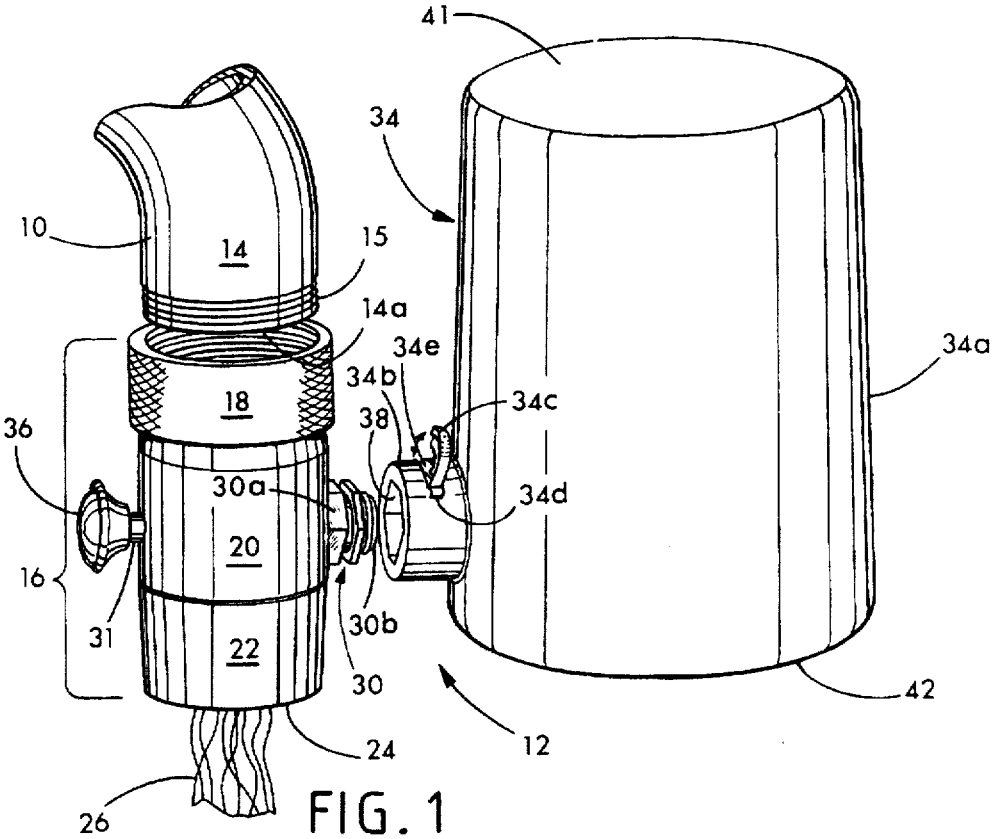
FIG. 1 is a perspective exploded view of the invention.
Figure 2:
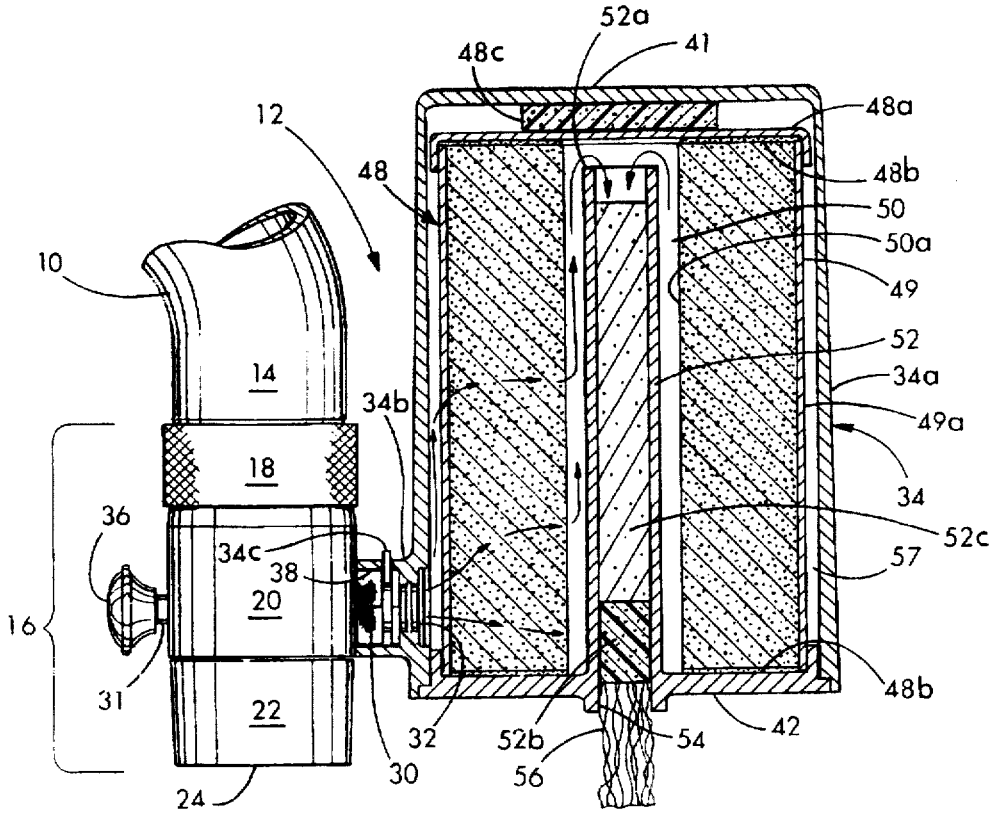
FIG. 2 is a vertical sectional view of the invention as seen mounted upon a water faucet.

The invention provides a faucet-mounted water filter comprising an upright tubular diverter body that is adapted to be secured to the open end of the water faucet. The tubuler diverter body has a water inlet at the top that is connected during operation to the water faucet as by means of threaded connection. At the bottom of the diverter body is a water outlet through which unfiltered water can be dispensed. In the diverter body is a valve with a valve outlet duct projecting from one side of the diverter body. A manually movable valve handle projects from the diverter body and is connected to the valve to shift the valve of a horizontal axis from right to left for directing the flow of water either through the water outlet (when unfiltered water is required) or for diverting water through the outlet duct. The outlet duct defines a filter housing support. A filter housing is mounted upon the filter housing support and is preferably connected to the diverter by means of the support. A solid filter element is provided in the filter housing. The later element includes a vertical water inlet surface on an outside wall and a water outlet. The filter housing has an annular chamber for unfiltered water which surrounds the filter element. The outlet duct of the valve is connected through the side of the filter housing at an elevation which communicates through the annular chamber with the water inlet surface of the filter element. The water outlet of the filter element communicates with a dispensing opening located at the bottom of the filter housing for filtered water.

In a modified form of the invention, a prefilter composed of paper or the like is provided for prefiltering the water before it enters the main filter element.

DETAILED DESCRIPTION OF THE INVENTION

As shown in FIGS. 1–3a, a water filter assembly 12 is secured to a water faucet 10 at its outlet end 14 by means of screw threads 15. The water filter assembly 12 includes a tubular upright diverter 16 having an internally threaded swivel collar 18 that is connected at its lower end to the body portion 20 of the diverter 16 for rotational movement so that by threading the swivel collar on the threads 15 at the outlet end 14 of the faucet 10, the body portion 20 of the tubular diverter 16 can be sealed to the faucet in an upright position. The diverter body 20 includes a lower outlet end portion 22 having an outlet opening 24 through which unfiltered water 26 can be dispensed when required.

Figure 3:
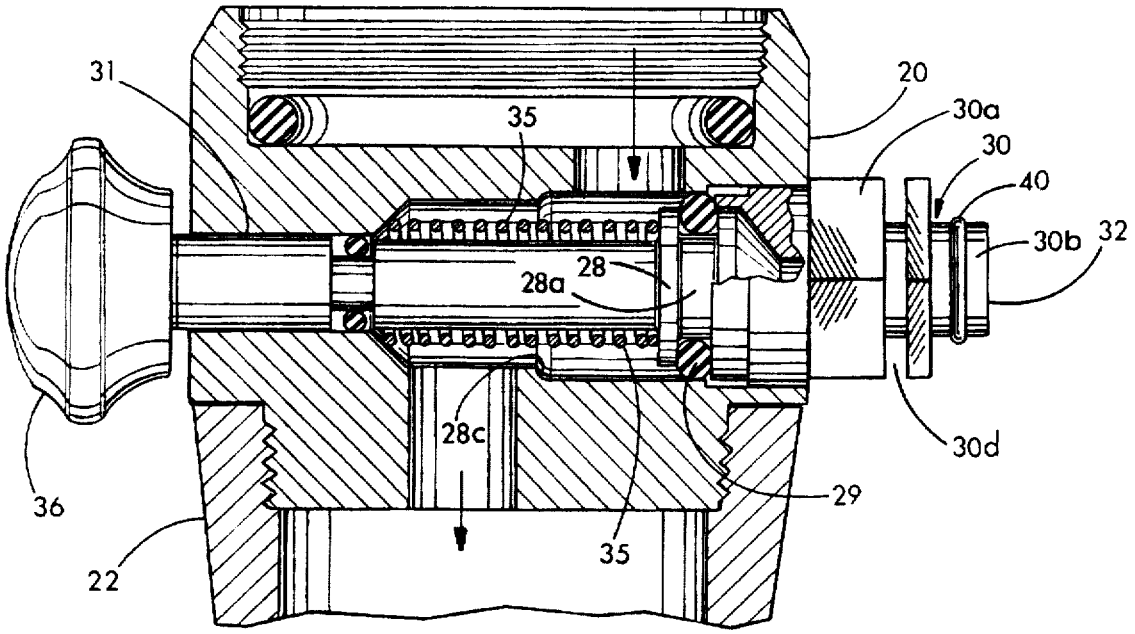
FIG. 3 is an enlarged cross-sectional view of the diverter valve and associated structure on an enlarged scale relative to FIG. 2.

Inside the diverter body 20 is a diverter valve 28 which is sealed by means of an O-ring 29 which is held in an annular groove 28a. The valve 28 communicates during operation through a valve outlet duct 30 having a non-circular portion 30a (shown as hexagonal) and a circular portion 30b that projects outwardly from one side of the body 20 of the diverter 16 and has an open end 32 through which water is diverted into a filter housing to be described. The circular portion 30b has an O-ring 40 to prevent leakage. The valve 28 is mounted on a laterally slidable valve stem 31 and is urged toward a closed position, i.e. toward the right in the figures, by means of a helical return spring 35. The valve stem 31 projects out through the housing 20 at its left end and has a valve handle 36 at its end which can be grasped manually to pull the valve 28 to the open position toward the left in the figure against the return spring 35, allowing water to be diverted through the outlet duct 30 into a filter housing 34. A carbon block filter (to be described) within filter housing 34 produces backpressure in the line. The O-ring 29 then becomes sealed in a seat 28c and is held there by backpressure developed in the diverter 16 as long as the faucet 10 is turned on. In this position the water outlet opening 24 is sealed. The spring 35 is preferably made with a compression strength that will allow the valve 28 to remain in a water diverting or "filter" position against its seat 28 under the influence of the water backpressure on the right end of the valve 28 due to water resistance developed in the filter housing 34 as long as water is flowing. When the water to the faucet 10 is turned off, the water pressure to the right of valve 28 is reduced allowing spring 35 to return the valve 28 to its seated position as shown in FIG. 3. This prevents water from passing through the filter housing 34 the next time and each time the water is turned on, thereby prolonging the life of the filter. The structure thus far described, except for the rubber O-ring 29, is preferably formed from metal.

Supported on the outlet duct 30 is the filter housing 34 which in this case is generally cylindrical in shape and includes a cylindrical side wall 34a having a boss 34b extending from the left side as shown in the figures to receive the duct 30 which acts as a support for the filter housing 34. The filter housing is provided with an opening 38 in boss 34b in which the duct 30 can be secured as with a retaining clip 34c connected by means of an integral hinge 34d to boss 34b. The clip 34c extends through a slot 34e in the boss 34a into a groove 30d in the duct 30. The O-ring 40 seals the connection between the filter housing 34 and the diverter 16.

The filter housing 34 includes top and bottom walls 41 and 42. The bottom wall is a separate piece that can be snap-fitted or bonded in place with an adhesive. Inside the filter housing 34 is a carbon block filter 48 having a vertical cylindrical water inlet surface 49. If desired, the carbon block filter 48 can be surrounded by a porous paper sleeve 49a which serves as a prefilter. The top is enclosed by an end cap 48a preferably formed from nonporous plastic. The carbon block filter 48 itself is a solid body preferably formed from a porous monolithic agglomerate of carbon particles. The carbon block filter 48 is held securely in place by spacer 48c. The filter 48 has an inner hollow vertical core 50 with a vertical wall 50a that defines a filter outlet surface. The bottom wall 42 of the filter housing has a vertically extending reversion tube 52 that projects upwardly within the hollow core 50 of the filter block 48 and has an open mouth 52a proximate to the upper end of the core 50 to direct the flow of filtered water first upwardly through the hollow core 50, next through the mouth 52a and thence downwardly and out through a water dispensing outlet 54.

If desired, the reversion tube 52 can contain a porous filter medium 52b such as a porous plastic cylinder, e.g. a Porex ® filter. Optionally above the medium 52b is a vertically disposed porous medium 52c located centrally within the reversion tube 52 for absorbing heavy metals, e.g. an ion exchange resin or a KDF 55-D$_{TM}$ medium by KDF Fluid Treatment, Inc., Constantine, Mich.

The filter block 48 can be held in place by means of a bonding medium 48b such as hot melt adhesive at the top and bottom ends thereof.

Surrounding the filter 48 within housing 34 is an annular water distribution chamber 57. The outlet duct 30 of the valve 28 is connected through the boss 34b at the side of the filter housing 34 at an elevation which communicates through the annular water distribution chamber 57 with the water inlet surface 49 of the filter element 48. The water outlet surface 50a of the filter element communicates through core 50 with the opening 54 which dispenses the water that has been filtered by passing through the filter element 48.

If desired, the cover 41 can be bonded in place or integral with the sidewall 34a of the filter housing, in which case the carbon block filter 48 cannot be replaced separately. Instead, in this case both the housing and filter are disposed of and replaced together as a single unit.

Figure 3A:
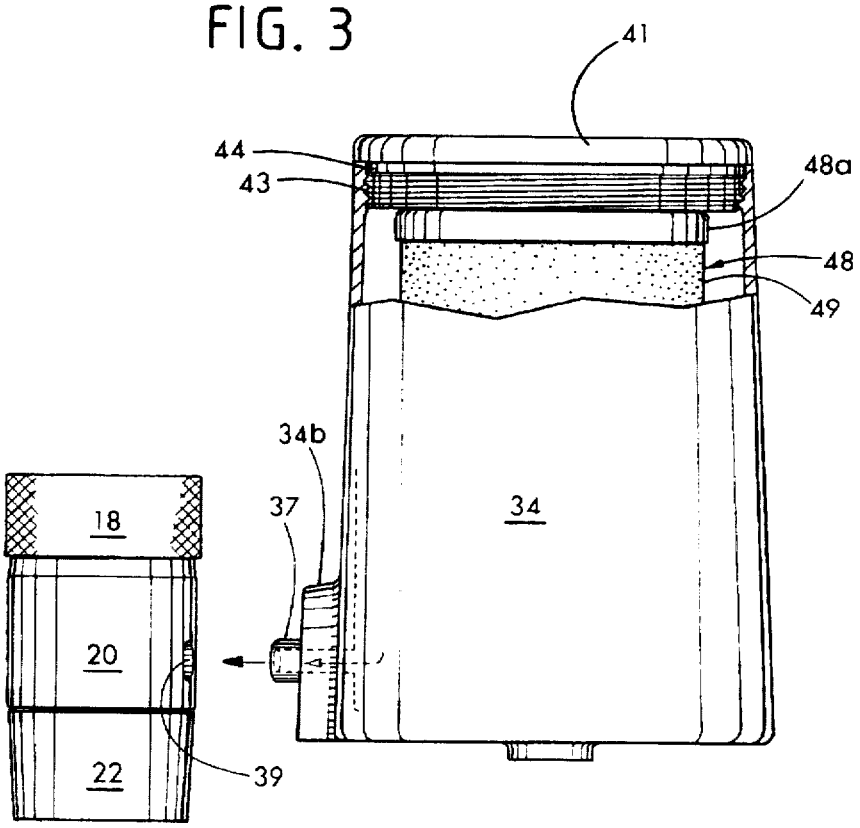
FIG. 3a is a fragmentary view of a modified form of the invention.

In a modified form of the invention shown in FIG. 3a, the duct 30 is replaced by means of a duct 37 that is affixed to the boss 34b of the filter housing 34. An opening 39 is provided in this case in the body 20 of the diverter 16 to receive the duct 37. The duct 37 can be held in the diverter by being press-fitted into the opening 39 or can be held in place by means of a bayonet connection or other fastening means such as a U clip, cotter pin, etc. The duct 37 communicates with the valve 28 in the same manner as the duct 30 to receive the flow of water from the faucet when the valve handle 36 is withdrawn manually to move the valve 28 toward the left to the "filter" position. A cover 41 is removably secured by means of screw threads at 43 and sealed by means of a gasket 44 so the carbon block filter 48 can be removed and replaced when required. To distribute the water entering the distribution chamber 57 more evenly, a baffle or deflector means 46 can be provided to extend upwardly from the bottom wall 42 of the filter housing 34 to direct the flow of water from the duct 30 upwardly and toward the sides.

Figure 4:
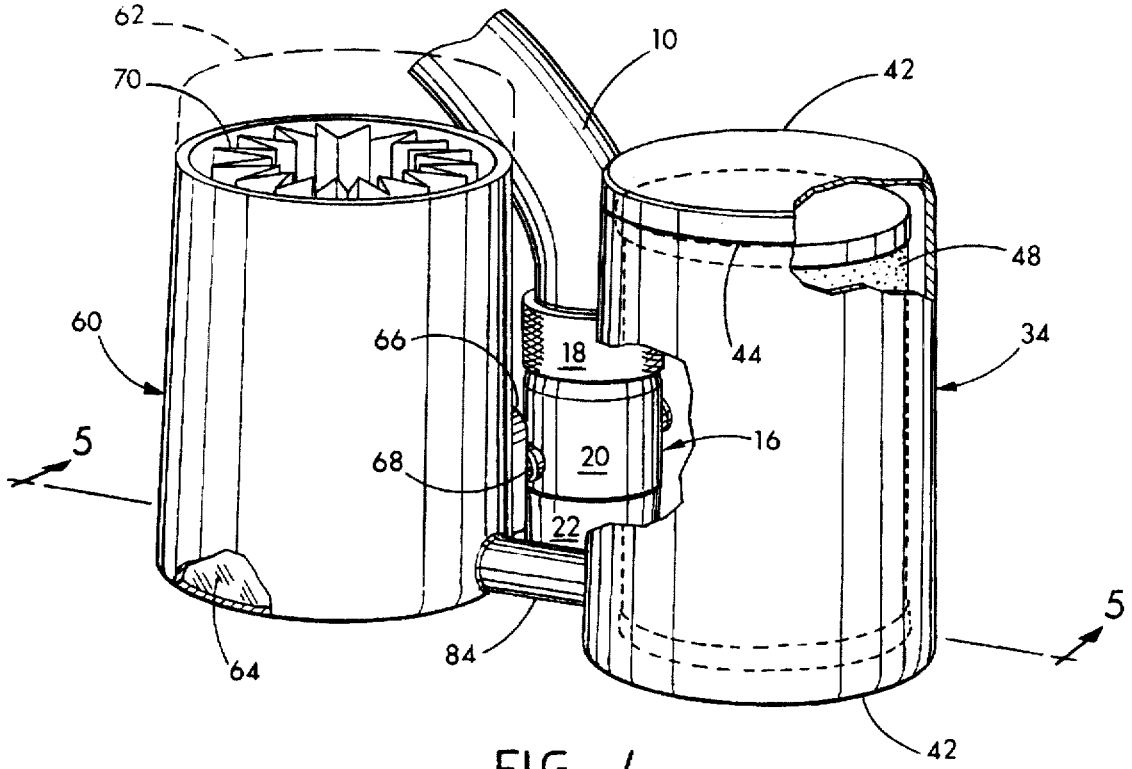
FIG. 4 is a perspective view of a modified form of the invention.
Figure 5:
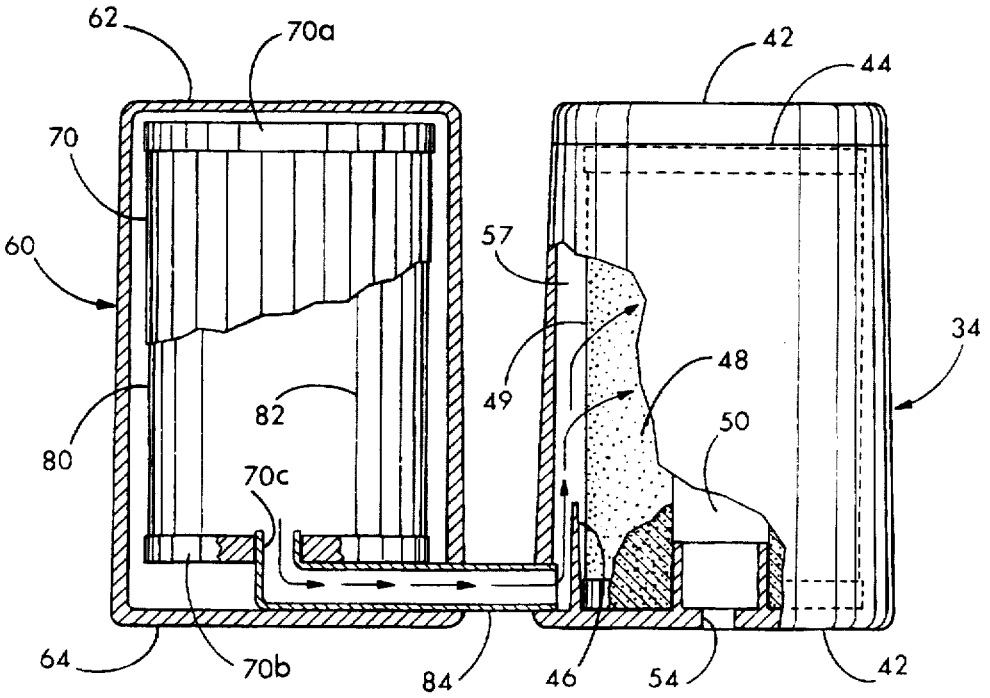
FIG. 5 is a vertical sectional view taken on line 5—5 of FIG. 4.

Refer now to FIGS. 4 and 5 which illustrate another modified form of the invention. As shown in FIGS. 4 and 5, a hollow filter housing 60 of cylindrical configuration including a cylindrical sidewall and horizontally disposed upper and lower walls 62 and 64 is provided with a boss 66 on the cylindrical sidewall. The filter housing 60 is secured to the diverter 16 by means of a horizontal duct 68 which is similar to the duct 30 or 37. Duct 68 directs the flow of water from the valve 28 within the diverter 16 into the filter housing 60. Within the filter housing 60 is a prefilter 70 composed of pleated paper, fabric or other fibrous material for removing sediments and heavy particles and to assist in preventing premature blockage of the carbon block filter. The prefilter 70 is provided with non-porous top and bottom end caps 70a and 70b and includes a vertical cylindrical water inlet surface 80 around the outside thereof and a water outlet surface 82 on the inside which communicates through an opening 70c in the bottom end cap 70b, thence through a passage 84 with the filter housing 34 which contains the carbon block filter 48. Water passing in to filter housing 34 from passage 84 fills the annular water distribution chamber 57, then passes through the vertical inlet surface 49 of the carbon block filter 48 to the hollow inner core 50 which communicates through the dispensing opening 54. In this way, the water from the upright tubular diverter 16 passes first through the pleated paper prefilter 70 housing 34 and through the carbon block filter 48.

The invention has numerous advantages. The diverter 16 occupies very little space because of its upright tubular shape. It also fits like a nozzle on the end of the faucet in an upright position aligned with the downward flow of water through the end of the faucet. The valve 28 has the advantage of sliding horizontally during use rather than rotating so that one can easily see by the position of the valve handle 36 that the valve 28 is open. Moreover, the spring 35 returns the valve 28 automatically to a closed position when the water is turned off at the faucet, preventing reuse of the filter 48 without reactivating the valve by pulling on handle 36. This has been found to prolong the life of the filter 48.

The monolithic carbon block filter 48 is not subject to channeling like a granular filter and therefore exhibits a much longer life than filters that employ loose clusters or granules. In addition, the invention is more compact because the filter housing 34 is in contact or almost in contact with the diverter 16. It therefore occupies a minimum of space around the water faucet and will not be in the way. The hollow core of the block filter 48 has been made to contain a reversion tube for reversing the flow first upwardly and then downwardly through a second filter medium to make efficient use of a hollow space provided within the block filter. Moreover, the filters in accordance with the invention require relatively few parts and can therefore be economically manufactured.

Many variations of the present invention within the scope of the appended claims will be apparent to those skilled in the art once the principles described herein are understood.

What is claimed is:

1. A water faucet-mounted water filter comprising a diverter having an upright diverter body which has a water inlet at the top thereof connected to the water faucet, said diverter body having a water outlet at the bottom thereof, a valve in the diverter body with a valve outlet duct projecting from one side of the diverter body, a manually movable valve handle projecting from the diverter body and connected to the valve for selectively directing water flow either through the water outlet or through the duct, the outlet duct defining a filter housing support, a filter housing defining a filter chamber having side, top and bottom walls, said housing being mounted upon the filter housing support and being connected to the diverter thereby, a filter element in the filter housing, said filter element having a vertical water inlet surface on a side wall thereof and a water outlet, the filter housing having an annular water distribution chamber for unfiltered water surrounding the filter element, the outlet duct of the valve being connected through a wall of the filter housing so as to communicate through the annular water distribution chamber with the water inlet surface of the filter element, and the water outlet of the filter element communicating with a dispensing opening in the filter housing for expelling filtered water from the filter housing, whereby the filter housing is supported upon the upright diverter in close proximity or in contact therewith.

2. The water filter of claim 1, wherein the valve [is movable to] *connects, in* a water diverting position [directing], *the diverter water inlet to the diverter outlet duct for diverting* the flow of water to the filter [and sealing the water outlet], said valve being held in said diverting position under the influence of water backpressure due to water resistance in the filter housing [and means is provided for returning the valve to a position directing the flow of water through the water outlet when the water backpressure is reduced].

3. The water filter of claim 1 wherein the filter element comprises a solid porous monolithic agglomerate of carbon particles and includes a hollow central core communicating with said water outlet, said water outlet is at the bottom of the filter and is sealed to said dispensing opening in the filter housing.

4. The filter of claim 1, wherein the filter element includes upper and lower ends, *and* a cap is secured to the upper and lower end of the filter element[, said inlet surface comprises a cylindrical outside wall of said filter element, said filter element has an internal bore defining an outlet surface therein, and said bore has a lower end that is sealed to a wall of said filter housing so as to allow communication of the bore at the center of the filter through the dispensing opening in the wall of the filter housing].

5. The filter of claim 1 wherein said outlet duct of the diverter is threaded and the filter housing has a horizontal bore threadedly connected to the outlet duct to hold the filter housing in contact *with the diverter* body.

6. The apparatus of claim 1 wherein the valve outlet duct of the diverter communicates into the annular water distribution chamber through a side wall of the filter housing and a deflector means is provided adjacent the outlet end of the duct to distribute incoming water vertically and horizontally within the annular water distribution chamber.

7. The filter of claim 1 wherein two filters are provided including a fibrous prefilter communicating between the filter and the diverter to remove particulate material from the water before reaching the filter.

8. The filter of claim 1 wherein the filter element comprises a prefilter, a second filter chamber is connected to the filter housing, a passage communicates with the outlet surface of the filter element for conveying filtered water into the second filter chamber, and a carbon block filter is provided within the second filter chamber to further filter the water received from the filter housing through the passage.

9. The filter of claim 1 wherein the water outlet of the filter element comprises a hollow vertical core having a vertically extending outlet surface surrounding the hollow core, a vertically disposed reversion tube is connected to the bottom wall of the housing at a lower end thereof and has an open mouth at the upper end thereof, said reversion tube directing the flow of water upwardly through the core on the outside thereof, next through the mouth at the top thereof and thence downwardly and through the dispensing opening.

10. The filter of claim 9 wherein a second filter element is positioned within the reversion tube.

11. The element filter of claim 10 wherein the second filter is porous plastic.

12. The element filter of claim 10 wherein the second filter is a vertically disposed porous metal-absorbing medium located centrally within the reversion tube.

13. A water faucet-mounted water filter comprising, a diverter having a diverter body with a water inlet *at one end* constructed to be connected to a water faucet, said diverter having a water outlet *at an end opposite the water inlet* for dispensing water to the sink or other receptacle, a movable valve in the diverter body for diverting water to a diverter outlet duct, a filter housing connected to the diverter outlet duct and supported by the diverter body, said filter housing defining a filter chamber, a carbon block filter element therein having a *vertical* water inlet surface on a side wall *thereof* with an annular water distribution chamber surrounding the filter element, the outlet duct of the diverter body [valve] is connected through a wall of the filter housing so as to communicate through the annular water distribution chamber with the water inlet surface of the carbon block filter element, and said filter element having a water outlet communicating with a dispensing opening in the filter housing *for dispensing water to the sink or other receptacle* whereby the filter housing and carbon block filter element are supported upon the diverter in close proximity or in contact therewith.

14. The water filter of claim 13 wherein a porous filter is provided in communication between the carbon block filter element and the diverter to remove particulate material from the water before reaching the filter block.

15. The water filter of claim 13 wherein the carbon block filter element has a hollow core, a tube is mounted in the hollow core and a metal-absorbing material is mounted in the tube.

*16. The water filter of claim 1, wherein the diverter water inlet is positioned opposite of the diverter water outlet.*

*17. The water filter of claim 1, wherein the filter element is a carbon block filter element having a cylindrical vertical water inlet surface on a cylindrical side wall thereof and a hollow core forming a water outlet at a bottom end of the filter element.*

*18. The water filter of claim 2, wherein the diverter further includes means for returning the valve to a non-filtering position for directing the flow of water through the water outlet when the water backpressure is reduced.*

*19. The water filter of claim 18, wherein said valve is positioned transversely in the diverter body and is movable from the non-filtering position where unfiltered water enters the diverter water inlet and exits the diverter water outlet to the diverting position where the unfiltered water enters the diverter water inlet and exits the diverter outlet duct.*

*20. The water filter of claim 2, wherein the valve seals the water outlet when the valve is in its diverting position.*

*21. The water filter of claim 20, wherein the valve prevents flow of water to the filter when the valve is in a non-filtering position directing flow of water through the water outlet.*

*22. The water filter of claim 4, wherein the water inlet surface comprises a cylindrical outside wall of the filter element, the filter element having an internal bore defining an outlet surface therein, and the bore having a lower end that is sealed to a wall of the filter housing so as to allow communication of the bore through the dispensing opening in the wall of the filter housing.*

*23. The water faucet-mounted water filter of claim 13, wherein the dispensing opening is centrally positioned on a bottom of the filter housing.*

*24. The water faucet-mounted water filter of claim 13, wherein the carbon block filter element has a cylindrical vertical water inlet surface on a cylindrical side wall thereof and a hollow core forming a water outlet at a bottom end of the filter element.*

*25. The water faucet-mounted water filter of claim 13, wherein the valve seals the water outlet when the valve diverts water to the diverter outlet duct and blocks flow of water to the diverter outlet duct when the valve permits dispensing of water through the water outlet.*

*26. The water faucet-mounted water filter of claim 13, wherein the filter element includes an upper end, a lower end, an upper cap secured to the upper end, and a lower cap secured to the lower end.*

*27. The water faucet-mounted water filter of claim 26, wherein the water faucet-mounted water inlet surface comprises a cylindrical outside wall of the filter element, the filter element having an internal bore defining an outlet surface therein, and the bore having a lower end that is sealed to a wall of the filter housing so as to allow communication of the bore through the dispensing opening in the wall of the filter housing.*

*28. The water faucet-mounted filter of clam 13, further comprising a second filter element positioned within the filter housing in vertical alignment with the dispensing opening.*

*29. The water-faucet-mounted water filter of claim 28, wherein the second filter element is porous plastic.*

*30. A water faucet-mounted water filter for filtering impurities from water received from a water faucet, the water filter comprising:*

*(a) a diverter including:*

*an upright diverter body with a water inlet at a top end thereof, the water inlet having an internally threaded swivel collar constructed to be connected to the water faucet for receiving unfiltered water and a water outlet at a bottom end of the diverter body opposite the water inlet for dispensing unfiltered water from the diverter to a sink or other receptacle;*

*a diverter outlet duct projecting from one side of the diverter body; and*

*a valve in the diverter body, the valve being movable from a first position where the unfiltered water enters the water inlet and exits the water outlet to a second position where the unfiltered water enters the water inlet and exits the diverter outlet duct;*

*(b) filter housing defining a filter chamber, the filter housing having:*

*a cylindrical side wall;*

*a top portion closed by a top wall integrally formed to the side wall;*

*a bottom portion closed by a separately formed bottom wall;*

*a boss extending from one of said walls of the filter housing and connecting the filter housing to the diverter outlet duct such that the filter housing is supported by the diverter body, the boss having an opening through the wall from which the boss extends and the diverter outlet duct being connected through the boss opening to the filter chamber; and*

*a dispensing opening positioned on the bottom wall for dispensing filtered water from the filter housing into the sink or other receptacle;*

*(c) a carbon block filter element positioned in the filter chamber such that the filter housing and the filter element are supported upon the diverter in close proximity to or in contact with the diverter, the filter element including a water inlet surface on a side wall thereof and a water outlet; an annular water distribution chamber surrounding the filter element, wherein the diverter outlet duct communicates through the annular water distribution chamber with the water inlet surface of the filter element, and wherein the water outlet of the filter element communicates with the dispensing open-*

*ing of the filter housing such that the filtered water is dispensed from the filter housing.*

*31. The water faucet-mounted water filter of claim 30, wherein the valve seals the water outlet when the valve is in its second position and blocks flow of water to the diverter outlet duct when the valve is in its first position.*

*32. The water faucet-mounted water filter of claim 30, including a valve handle projecting outward from the diverter body from a side opposite the diverter outlet duct and connected to the valve for selectively moving the valve from the first position to the second position.*

*33. The water faucet-mounted water filter of claim 30, wherein said valve is positioned transversely in the diverter body and is movable from a first position where unfiltered water enters the diverter water inlet and exits the diverter water outlet to a second position where the unfiltered water enters the diverter water inlet and exits the diverter outlet duct.*

*34. The water faucet-mounted water filter of claim 33, wherein the diverter further includes a diverter handle projecting outward from the diverter body from a side opposite the diverter outlet duct.*

*35. The water faucet-mounted water filter of claim 34, wherein the valve is held in the second position under the influence of water backpressure due to water resistance in the filter housing.*

*36. The water faucet-mounted water filter of claim 35, wherein the diverter further includes means for returning the valve to the first position for directing the flow of water through the filter element water outlet when the water backpressure is reduced.*

*37. The water faucet-mounted water filter of claim 36, wherein the diverter outlet duct defines a filter housing support.*

*38. A water faucet-mounted water filter for filtering impurities from water received from a water faucet, the water filter comprising:*

*(a) a diverter including:*

*an upright diverter body with a water inlet at one end thereof constructed to be connected to the water faucet for receiving unfiltered water and a water outlet at an end of the diverter body opposite and in vertical alignment with the water inlet for dispensing the unfiltered water from the diverter to a sink or other receptacle;*

*a diverter outlet duct projecting from one side of the diverter body; and*

*a valve in the diverter body, the valve being movable from a first position where the unfiltered water enters the water inlet and exits the water outlet to a second position where the unfiltered water enters the water inlet and exits the diverter outlet duct;*

*(b) a filter housing connected to the diverter outlet duct and being supported by the diverter body, the filter housing defining a filter chamber and including a dispensing opening for dispensing filtered water from the filter housing into the sink or other receptacle, the diverter outlet duct being connected through a wall of the filter housing to the filter chamber; and*

*(c) a carbon block filter element positioned in the filter chamber such that the filter housing and the filter element are supported upon the diverter in close proximity to or in contact with the diverter, the filter element including a vertical water inlet surface on a side wall thereof and a water outlet surface; an annular water distribution chamber surrounding the filter element, wherein the diverter outlet duct communicates through the annular water distribution chamber with the water inlet surface of the filter element such that the unfiltered water is passed through the filter element, and wherein the water outlet surface of the filter element communicates with the dispensing opening in the filter housing such that the filtered water is dispensed from the filter housing.*

*39. The faucet-mounted water filter of claim 38, wherein the carbon block filter element has a cylindrical vertical water inlet surface on a cylindrical side wall thereof and a hollow core forming a water outlet at a bottom end of the filter element.*

*40. The water faucet-mounted water filter of claim 38, wherein the valve seals the water outlet when the valve is in its second position and blocks flow of water to the diverter outlet duct when the valve is in its first position.*

*41. The water faucet-mounted water filter of claim 38, including a valve handle projecting outward from the diverter body from a side opposite the diverter outlet duct and connected to the valve for selectively moving the valve from the first position to the second position.*

* * * * *